Oct. 13, 1936.  F. D. CHAPMAN  2,057,366
APPARATUS FOR TREATING FOOD
Filed Sept. 23, 1935

INVENTOR.
F. D. Chapman
BY
Morsell, Lieber & Morsell
ATTORNEYS.

Patented Oct. 13, 1936

2,057,366

UNITED STATES PATENT OFFICE 2,057,366

APPARATUS FOR TREATING FOOD

Frank D. Chapman, Berlin, Wis.

Application September 23, 1935, Serial No. 41,726

15 Claims. (Cl. 53—18)

The present invention relates to improvements in the art of processing foods, and relates more specifically to an improved apparatus for heat treating fluent or granular food products such as legumes.

An object of the invention is to provide an improved apparatus for heat treating relatively granular edible substances such as green peas or the like.

In my prior application Serial No. 37,321, filed August 22, 1935, I have shown and described an improved system for continuously and automatically heat treating legumes by introducing the same in a stream of liquid flowing through an elongated conduit and by subjecting the flowing mixture to heat for a desirably long period of time. In order to insure uniform heat treatment of the granules, it is preferable to maintain the volume and rate of flow of the mixture of liquid and granules, substantially constant at all times, and my prior apparatus provides for such operation in order to secure any desired predetermined velocity of flow. It is also desirable in order to effectively sterilize the food by destroying objectionable bacteria, to vary the degree of heat to which the product is subjected, either by varying the period of time during which the mixture remains subject to the treating temperature, or by subjecting the mixture to relatively high temperature while the same is under pressure sufficient to prevent boiling of the liquid. The former of these processing steps is also disclosed in my prior application; and the feature of subjecting the constantly advancing stream of mixture during heat treatment to temperatures considerably above the normal boiling point of the liquid while maintaining the same under pressure sufficient to prevent actual boiling, and of cooling and subsequently releasing the treated product to atmospheric conditions without damage, is the gist of the present invention. While this new and improved result is effectively attainable with the aid of a pump or turbine rotor disposed directly in the conveying conduit, and adapted to establish pressure therein above atmospheric, it is also capable of being produced by any other valveless means such as a pressure chamber into which the finally treated product is delivered, and the mechanism for finally packing batches of the treated product may also be disposed within a pressure chamber, if so desired.

In view of the foregoing digest, it will be apparent, that a more specific object of the present invention, is to provide an improved system for accurately controlling the thermal conditions to which the food is subjected during heat treatment thereof, without interfering with the continuity of the treating process.

Another specific object of the invention is to provide simple and efficient apparatus which functions automatically to create a predetermined back pressure within the conveying conduit of a sterilizer wherein the granular food particles are conveyed and simultaneously sterilized by a liquid medium, so as to permit heating of the food to temperatures above the normal boiling point of the liquid medium while at the same time permitting cooling and subsequent release of the treated granules to atmospheric conditions without disrupting the food particles.

Still another specific object of the invention is to provide various improvements in sterilizers, which are cooperable with the improvements disclosed in my prior application hereinabove referred to, to produce a heat treating system of extreme flexibility and having maximum efficiency.

These and other objects of the present invention will be apparent from the following detailed description, and some of the improvements in heat treating systems which are disclosed but not specifically claimed herein, form the subject of my co-pending application Serial No. 37,321, filed August 22, 1935.

A clear conception of an embodiment of the present invention, and of the steps involved in the improved system of heat treatment, may be had by referring to the drawing accompanying and forming a part of this specification in which like reference characters designate the same or similar parts in the several views.

Figure 1:
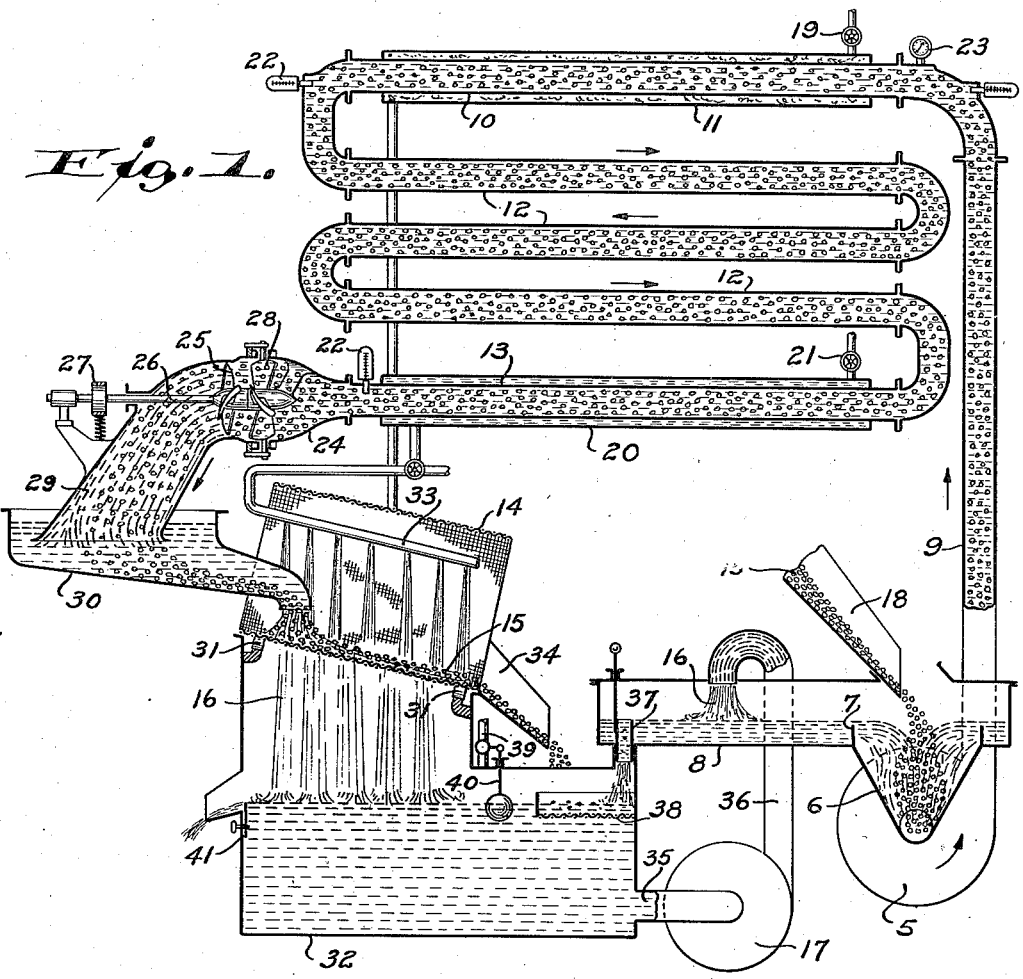
Fig. 1 is a diagram illustrating a central vertical section through one specific type of heat treating apparatus capable of exploiting the improved process.

As previously indicated, means other than or in addition to the rotary impeller specifically shown, may be utilized in order to create increased pressure and temperature within the conveying conduit, and it is not intended to unnecessarily restrict the scope of the present invention by such specific embodiment.

Referring to the diagram, the improved heat treating system depicted therein, comprises in general a rotary conveying pump 5 having an axial inlet communicating through an unobstructed funnel or cone 6 and over an annular wier 7 with a liquid supply reservoir 8 and also having a peripheral discharge communicating directly with an initial conveyor pipe 9; a combined conveying and initial heating conduit 10 communicating with the pipe 9 and surrounded by a heating jacket 11; one or more subsequent heat transfer conduits 12, 13 arranged in series and communicating with the initial heating conduit 10; means associated with the delivery end of the last conduit 13 for controlling the pressure existing within the conduits 10, 12, 13; a separator 14 for removing the treated granules or peas 15 from the conveying and treating liquid 16; and a second pump 17 for returning the separated liquid 16 to the supply reservoir 8 for recirculation through the system.

The main conveyor pump 5 is of the centrifugal trash impelling type having a relatively unobstructed rotor, and the untreated peas 15 may be supplied to the cone 6 below the wier 7, along a spout 18. The cone 6 may be of any desired shape, and the wier 7 extends upwardly into the reservoir 8 in a manner to permit an abundant flow of liquid 16 into the cone, thereby engulfing the peas 15 delivered centrally into the vortex of liquid within the cone and producing a thorough mixture. The pump 5 is adapted to urge this mixture through the pipe 9 into the initial heating conduit 10, and the heating jacket 11 may be supplied with steam through a pipe 19 and serves to heat the mixture of liquid and peas as it flows through this conduit 10 to any desired temperature. The last conduit 13 may be provided with a cooling jacket 20 supplied with liquid from a pipe 21, and suitable thermometers 22 and pressure gages 23 are provided at various points along the heat treating conduits 10, 12, 13.

Figures 2, 3:
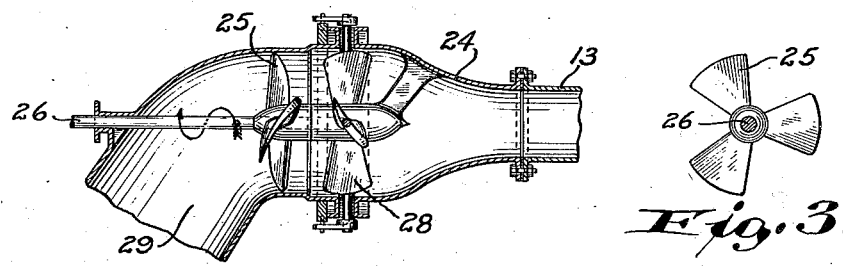
Fig. 2 is an enlarged central longitudinal section through a high speed low head turbine unit such as may be employed to create a back pressure in the conveyor conduit.
Fig. 3 is a plan view of the high speed turbine impeller.

The means for controlling the pressure and temperature existing within the conveyor conduits, may be of varied form, and in the specific embodiment disclosed in Figs. 1, 2 and 3, this means comprises a small low-head high-speed hydraulic turbine unit, the inlet casing 24 of which communicates directly with the discharge end of the conduit 13. This turbine unit has an open axial-flow impeller 25 mounted upon a shaft 26 provided with an adjustable brake 27, and the liquid is delivered against the rotor or impeller 25 through the casing 24 past adjustable swirl-producing guide vanes 28. The casing 24 communicates with a draft-tube 29 beyond the impeller 25, and the lower discharge end of this draft tube discharges into a basin 30 having an outlet which is directed into the interior of the separator 14. This separator comprises an open ended inclined cylindrical screen revolvably supported upon trunnions 31 carried by a liquid supply tank 32; and a liquid spray pipe 33 which communicates with the cooling jacket 20, extends longitudinally within the upper portion of the revolving separator 14. The separator 14 is adapted to remove the peas 15 from the liquid 16, and to deliver the finally treated peas upon a discharge chute 34, while the separated liquid gravitates into the tank 32.

The liquid supply tank 32 is disposed below the supply reservoir 8, and is in open communication with the suction line 35 of the pump 17 and the discharge line 36 of this pump is adapted to deliver liquid 16 directly to the reservoir 8 as shown. The reservoir 8 may be provided with a vertically adjustable overflow 37 in addition to the wier 7, for maintaining any desired level of liquid within the reservoir; and the overflow 37 is adapted to deliver excess liquid to the tank 32 through a screen 38 which serves to prevent peas and débris from entering the supply liquid. The tank 32 may also be provided with a fresh liquid supply pipe 39 having a float control 40, and may also be provided with an adjustable overflow 41 for discharging excess liquid.

During normal operation of the improved system, the supply tank 32 is maintained substantially filled with liquid by the float control 40, the pump 17 is operating to deliver liquid 16 from the tank 32 to the reservoir 8, the pump 5 is withdrawing mixture of liquid 16 and peas 15 and is delivering the same to the conduits 10, 12, 13 through the pipe 9, steam is being admitted in regulated quantities to the jacket 11 from the pipe 19, and cooling water is admitted from the pipe 21 to the jacket 20 and is discharged therefrom through the spray pipe 33 into the interior of the revolving separator 14. The level of the liquid 16 in the tank 32 is prevented from rising excessively, by the overflow 41, and the overflow 37, in the reservoir 8 insures substantially constant and abundant flow of liquid over the wier 7 into the cone 6. As the liquid 16 flows through the cone 6 and toward the pump 5, it assumes the form of a vortex, and the untreated peas 15 are precipitated from the chute 18 into the center of this vortex below the crest of the wier 7, and are thus engulfed and intimately mixed with the liquid. As the mixture of liquid and peas advances through the pipe 9 and subsequent conveying and treating conduits, the central portion or core of the stream tends to travel somewhat faster than the portion directly in contact with the conduit bounding surface, thereby causing the relatively buoyant peas 15 to travel with the core and avoiding excessive contact between the granules and the conduit walls.

When the stream of mixture passes through the conduit 10, it is initially heated to a relatively high temperature sufficient to completely sterilize the food from the jacket 11, and the heated mixture subsequently flows through the conduits 12 wherein the heat of the liquid is dispersed to the peas 15 which are thus uniformly and effectively sterilized. The mixture then proceeds through the conduit 13 wherein its temperature is materially reduced after complete sterilization by the cooling liquid in the jacket 20, and subsequently flows into and through the hydraulic turbine unit. In the turbine, the guide vanes 28 cause the entering mixture to swirl and deliver the swirling mass against the vanes of the impeller 25 which is revolved at a high speed the rate of which depends upon the resistance or drag applied to the shaft 26 by the brake 27. If this resistance increases, the pressure established in the casing 24 and in the conduits 13, 12, 10 is correspondingly increased, thereby permitting maintenance of temperatures within the conduits 10, 12 which are considerably above the normal boiling point of the transporting liquid 16 without causing this liquid to boil, and insuring complete and permanent sterilization of the food granules or peas 15. As the resistance is diminished, the treating pressure may also be diminished but the temperature must then be reduced correspondingly in order to prevent boiling, thus providing means for accurately and effectively controlling the degree and rate of heat transfer during the processing operation. The swirling mixture is delivered from the impeller 25 through the draft tube 29 wherein the velocity energy is absorbed and the basin 30 eventually receives the mixture at atmospheric pressure and at a temperature not exceeding 212° and delivers the same into the separator 14.

In the separator 14, the peas 15 may be further cooled and the liquid 16 may be tempered by the liquid delivered from the pipe 33, and the peas 15 are subsequently delivered to the chute 34, while the separated liquid 16 is deposited into the supply tank 32 for recirculation through the system. While the cooling and tempering liquid which is delivered by the pipe 33, may be derived from the jacket 20, other cooling liquid may also be injected directly into the pipe 33, in order to insure most effective tempering of the liquid within the tank 32. The fresh liquid supplied from the pipe 39 will also serve to condition the liquid supply in the tank 32 so as to insure most efficient operation of the pump 17, and the pumps 5, 17 may be driven at any desired speed.

From the foregoing description it will be apparent that the present invention provides an improved system for heat treating fluent or granular food products such as green peas, wherein the product may be uniformly heat treated in a most effective manner and in a relatively short period of time. The mechanism for controlling the pressure and temperature to which the product is subjected during heat treatment, functions automatically to maintain the product under pressure and to subsequently release the same to a lower pressure without in any manner injuring the product by explosions due to internal heat. The apparatus moreover prevents damaging the product during passage thereof through the conveyor conduits, and both the pump 5, and the hydraulic turbine unit are of such construction that injury to the product by impact is avoided. The hydraulic turbine unit may also be operated so as to only partially reduce the pressure upon the mixture as it leaves the heat treating conduit and if so desired, the turbine unit and the separator may be confined within a chamber so as to permit subsequent packing of the treated peas in containers under pressure and without releasing the same to the atmosphere. The improved apparatus which is shown diagrammatically in the drawing, and which is subject to considerable variation in structure, functions effectively to sterilize or heat treat the product under pressure while it flows continuously through the heating conduits, without necessitating the use of positve cut-off valves such as would tend to damage the relatively soft peas. The apparatus is, moreover, so constructed that it may be readily cleaned and maintained in sanitary condition, and may be operated at relatively low cost because of the fact that the liquid is constantly recirculated through the system.

It will be observed that with the present improvement most effective and complete sterilization of solid foods may be effected at relatively high temperatures by virtue of the fact that the commodity is maintained under pressure sufficient to prevent boiling of the conveying liquid, during the heat treating period. The product is subsequently cooled under pressure and is thereafter released to atmospheric conditions without in any manner distorting or damaging the solid food particles. This sterilization is moreover accomplished continuously and without the use of valves or other obstructions which would tend to damage the food particles, so that the process may be carried out in conjunction with standard equipment for subsequently packing the treated material in the cans. The sterilization under pressure insures destruction of the bacteria so that subsequent exposure of the product to the atmosphere will not destroy the sterile nature thereof.

It should be understood that it is not desired to limit the present invention to the exact details of construction of the apparatus herein shown and described, for various modifications within the scope of the claims may occur to persons skilled in the art.

I claim:—

1. A system for treating food, comprising, means forming a conduit for conveying a mixture of heated liquid and food, and means for automatically subjecting the delivery end of said conduit to a predetermined back pressure.

2. A system for treating food, comprising, means forming a conduit for conveying a mixture of heated liquid and food, and means disposed within the path of travel of the mixture from said conduit and rotatable by the stream of mixture to subject the flowing mixture to a predetermined back pressure.

3. A system for treating food, comprising, means forming a conduit for conveying a mixture of liquid and food, means for heating the mixture entering said conduit, and automatically operable means at the delivery end of said conduit for controlling the pressure therein.

4. A system for treating food, comprising, means forming a conduit for conveying a mixture of liquid and food, means for heating the mixture entering said conduit, and rotary means operable by the flow of mixture from said conduit for controlling the pressure within the latter.

5. A system for treating food, comprising, means forming a closed conduit of predetermined length for conveying a stream of mixed liquid and food, means for heating the liquid entering said conduit, means for cooling the mixture prior to delivery thereof from said conduit, and means associated with said conduit beyond said cooling means for controlling the pressure within said conduit.

6. A system for treating food, comprising, means forming a closed conduit of predetermined length for conveying a stream of mixed liquid and food, means for heating the liquid entering said conduit, means for cooling the mixture prior to delivery thereof from said conduit, and rotary means subjected to the flow of liquid from said conduit for controlling the pressure within the latter.

7. A system for treating food, comprising, means forming a conduit of predetermined length, means for causing a continuous flow of mixed liquid and food through said conduit, means for heating the mixture flowing through an initial portion of said conduit above the normal boiling point of the liquid, means for cooling the mixture flowing through a subsequent portion of said conduit, and means operable by the flow of liquid leaving said conduit for maintaining the liquid under pressure sufficient to prevent boiling.

8. A system for treating food, comprising, means forming a conduit of predetermined length, means for causing a continuous flow of mixed liquid and food through said conduit, means for heating the mixture flowing through an initial portion of said conduit, and means operable by the flow of liquid leaving said conduit for controlling the pressure upon the confined mixture.

9. A system for treating food, comprising, means forming an elongated closed conduit, means for forcing a stream of mixed liquid and food through said conduit, means for heating the inlet end of said conduit, mean for cooling the discharge end of said conduit, there being a substantial length of conduit between said heating and said cooling means, and means operable by the flow of liquid from said conduit for controlling the pressure upon the mixture passing through said intermediate conduit portion.

10. A system for treating food, comprising, means forming a conduit for confining a constantly flowing stream of mixed liquid and food, means for subjecting the stream to temperatures above the normal boiling point of the liquid, and automatic means for maintaining the mixture under pressure sufficient to prevent boiling of the liquid during transfer of the heat from the liquid to the food.

11. A system for treating food, comprising, means forming a closed conduit for conveying a stream of food bearing liquid, means for heating said liquid, and rotary means operable by the stream to control the pressure within said conduit.

12. A system for treating food, comprising, means forming a closed conduit for conveying a heated stream of food bearing liquid, and means operable by the stream to automatically control the pressure within said conduit.

13. A system for treating food, comprising, means forming a closed conduit for conveying a stream of food bearing liquid, means for heating the stream near the inlet portion of said conduit, and rotary means operable by liquid leaving said conduit to control the pressure within the conduit.

14. A system for treating food, comprising, means forming a closed conduit for conveying a stream of food bearing liquid, means for heating the stream near the inlet portion of said conduit, means for cooling the stream near the outlet portion of said conduit, and means operable by said stream for controlling the pressure within said conduit.

15. A system for treating food, comprising, means forming a closed conduit for conveying a stream of food bearing liquid, means for heating the stream near the inlet portion of said conduit, means for cooling the stream near the outlet portion of said conduit, and a rotor operable by said stream to automatically control the pressure within said conduit.

FRANK D. CHAPMAN.